US007221717B2

(12) United States Patent
Yuan et al.

(10) Patent No.: US 7,221,717 B2
(45) Date of Patent: *May 22, 2007

(54) BLUETOOTH ACCESS CODE ASSISTED INITIAL DC ESTIMATION AND FRAME SYNCHRONIZATION

(75) Inventors: Rebecca W. Yuan, San Diego, CA (US); Jyothis Indirabhai, San Diego, CA (US); Kevin Yen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/411,469

(22) Filed: Apr. 25, 2006

(65) Prior Publication Data

US 2006/0262836 A1 Nov. 23, 2006

Related U.S. Application Data

(63) Continuation of application No. 10/027,558, filed on Oct. 22, 2001, now Pat. No. 7,035,350.

(51) Int. Cl.
*H04L 25/06* (2006.01)
*H04B 7/00* (2006.01)

(52) U.S. Cl. ............. 375/319; 375/345; 455/41.2; 327/307

(58) Field of Classification Search ............... 375/285, 375/316, 317, 318, 319, 345, 346; 327/306, 327/307; 455/63.1, 296, 501
See application file for complete search history.

(56) References Cited

U.S. PATENT DOCUMENTS

| 5,629,960 | A | 5/1997 | Dutkiewicz et al. |
| 6,643,336 | B1 | 11/2003 | Hsieh et al. |
| 6,654,593 | B1 | 11/2003 | Simmons et al. |
| 6,697,098 | B1 | 2/2004 | Wang |
| 6,714,774 | B1 | 3/2004 | Nafie et al. |
| 6,760,705 | B2 | 7/2004 | Dvorak |
| 2003/0076905 | A1 | 4/2003 | Schetelig et al. |

OTHER PUBLICATIONS

Specification of the Bluetooth System, Wireless Connections Made Easy v. 1.0B Dec. 1, 1999, pp. 1-1080 Specification vol. 1.

*Primary Examiner*—Kevin Kim
(74) *Attorney, Agent, or Firm*—McAndrews, Held & Malloy, Ltd.

(57) ABSTRACT

A system for calculating DC offset and achieving frame detection is described. In one embodiment, the present invention includes an electronic device with an integrated receiver module. The receiver module can take advantage of a known synchronization pattern such as the Bluetooth access code to determine an initial DC offset and to provide frame detection.

14 Claims, 8 Drawing Sheets

BLUETOOTH ACCESS CODE ASSISTED INITIAL DC ESTIMATION AND FRAME SYNCHRONIZATION

CROSS-REFERENCE TO RELATED APPLICATIONS/INCORPORATION BY REFERENCE

This patent application is a continuation of U.S. patent application Ser. No. 10/027,558, filed on Oct. 22, 2001 now U.S. Pat. No. 7,035,350. The above-identified application is hereby incorporated by reference in its entirety.

RELATED APPLICATIONS

The present application is related to commonly owned and assigned, patent application Ser. No. 10/035,567, entitled System and Method for DC Offset Compensation and Bit Synchronization, which is filed on even date herewith and is incorporated herein by reference in its entirety. In this patent application, we describe a method that can be used to provide an accurate initial DC offset for the automatic DC tracker, thus improving the DC tracker's initial converge time and estimate stability. In the mean time, since the initial DC estimation is based on some known frame synchronization (sync) pattern, the method also performs and achieves frame detection. This patent application can therefore be applied to all wireless communication systems that use packet data with sync pattern in front.

FIELD OF THE INVENTION

The present invention relates to wireless communication devices and protocols. In particular, but not by way of limitation, the present invention relates to systems and methods for improving the quality and commercial appeal of wireless communications.

BACKGROUND OF THE INVENTION

Wireless communications and wireless communication devices are at the center of many important technological advancements. As the proliferation of these wireless devices increases, the efficiency and accuracy of the communications therebetween becomes vital to the commercial success of particular devices and particular communications protocols. One protocol that is showing great promise is Bluetooth (described in, for example, *The Specification of the Bluetooth System*, v1.0 B, Dec. 1, 1999), which is a wireless protocol that describes how mobile phones, computers, PDAs, peripherals and other devices can interconnect using a short-range wireless connection. *The Specification of the Bluetooth System*, v1.0 B, Dec. 1, 1999, which is publicly available, is incorporated herein by reference.

To implement Bluetooth and other such wireless protocols, a device receiving a transmitted signal is required to recover transmitted bit patterns. The basic recovering process involves waveform demodulation, DC compensation, bit synchronization and bit detection. Waveform demodulation usually is implemented in a radio module and is wireless protocol dependent. DC compensation can be implemented either in the radio module or in the baseband. It is a critical process, however, for achieving correct bit synchronization and detection. Bit synchronization and detection are usually implemented in the baseband and are common to many different wireless receivers. An automatic DC tracker and a bit synchronizer have been described in commonly owned and assigned patent application Ser. No. 10/035,567, filed Oct. 22, 2001.

DC offset is a variation in the intended DC voltage of the baseline signal caused, for example, by frequency drift in received Bluetooth GFSK signals. Present devices compensate for these imperfections in incoming signals using a variety of means—none of which are completely satisfactory. For example, certain electronic devices use analog components to calculate the DC offset, while other devices use digital components. The analog DC trackers usually are implemented as lowpass RC filters, while conventional digital approaches require a select number of bits to be buffered before any DC offset can be calculated.

The DC tracking accuracy of both conventional analog and digital circuits is affected by the incoming bit patterns. For instance, when a string of high values, e.g., "1s," is received the computed DC offset will be adjusted to a higher value even though the actual DC offset has not changed. This adjustment occurs because most automatic DC trackers assume an even distribution of high and low values in the received signal. In addition, the DC tracking accuracy and associated estimate variance are sensitive to selected time constant in analog filters. For conventional digital DC tracker, they are functions of the selected buffer size.

Although present analog and digital approaches to computing DC offsets for wireless communications are functional, they are not sufficiently accurate or otherwise satisfactory. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for calculating DC offset. In one embodiment, the present invention includes an electronic device with an integrated receiver module. The receiver module can take advantage of a known frame sync pattern, such as the Bluetooth access code, to approximate an initial DC offset. Although this receiver module can be implemented in a variety of ways, one implementation includes a radio module, an analog-to-digital (A/D) converter, an initial DC estimator, a DC tracker, and a bit synchronizer. Other implementations may remove the initial DC estimator and use the DC tracker only, or remove the DC tracker and freeze the initial DC estimator output for the entire data frame. In either case, less hardware is required.

In an exemplary mode of operation, an electronic device, such as a cellular phone, initially receives an RF signal that can be demodulated and down-converted a baseband signal in the radio module. The A/D converter is then used to sample and convert the baseband signal from analog to digital form. As mentioned previously, the first portion of the received usually includes a sync pattern. Samples corresponding to the sync pattern or a part of the sync pattern are used to calculate a DC summation ($DC_{sum}$). Using only a part of the sync pattern to perform this calculation can reduce the amount of hardware and processing time required.

The $DC_{sum}$ can be divided by the number of samples actually used in the summation to determine an average ($DC_{avg}$) value. Because the number of high bits and low bits may not be equal in the part of the sync pattern used for the calculation, a straight average does not necessarily provide an accurate estimation of the DC offset. To calculate a more accurate estimate, the $DC_{avg}$ can be adjusted by a compensation factor (comp_fac) generated from the chosen portion of the known sync pattern.

Using the calculated compensation factor, the compensated DC average ($DC_{avg\_comp}$) can be represented by $$DC_{avg\_comp}(k) \approx DC_{avg}(k) + \text{comp\_fac}$$

where k is the current sample time index.

Moreover, using the $DC_{avg\_comp}(k)$, a bit slicer can be applied to determine the binary value (0 or 1) of the received sync pattern samples contained in $DC_{sum}$. That is, if the sample value is greater than $DC_{avg\_comp}(k)$, it corresponds to a binary 0, otherwise it is a binary 1. A correlator module can correlate the bit slicer output with the chosen portion of the known sync pattern to determine whether a potential frame detection has occurred. For example, when a threshold number of the received sync pattern bits—adjusted according to the $DC_{avg\_comp}$—match corresponding bits in the known sync pattern, a potential frame detection can be declared.

To confirm the potential frame detection, the $DC_{avg\_comp}(k)$ is frozen at the time sample when the potential frame detection was declared. Next, a symbol peak is identified using the next set of (N−1) digital samples of the received signal. Here, N is the number of over-sampling compared to the nominal symbol rate. Using the frozen $DC_{avg\_comp}(k)$ and the identified symbol peak, a second portion of the received sync pattern is correlated with the rest of the known sync pattern. If a threshold number of bits in the second portion of the received pilot signal and the known sync pattern and the known sync pattern match, a formal frame detection is declared and the $DC_{avg\_comp}(k)$ is generated as an output for the following process, either as an initial estimate for a DC tracker or used as a frozen DC value for the rest of the data packet. Otherwise, the entire process is restarted and a new $DC_{avg\_comp}(k)$ is calculated using a next sample time.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
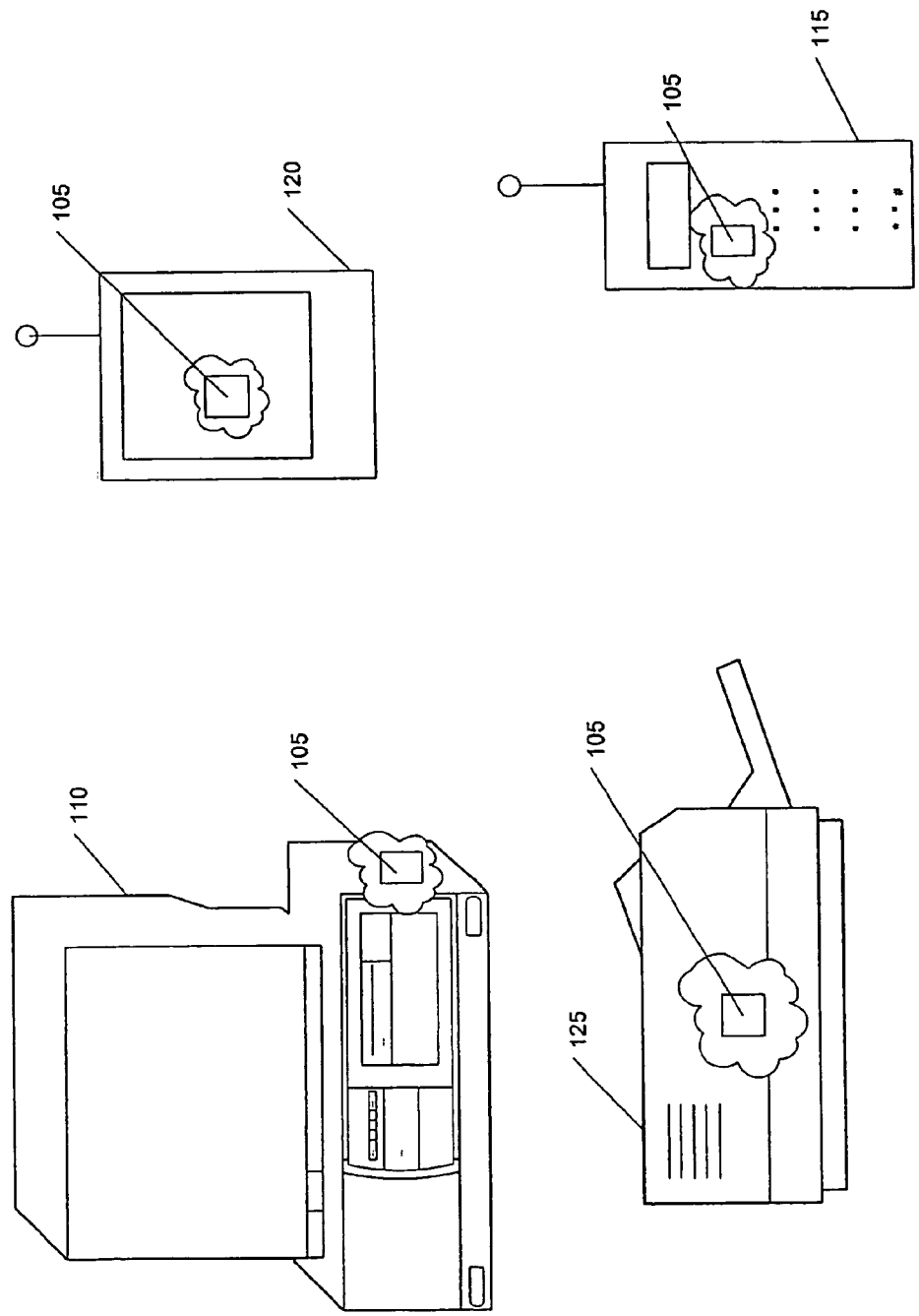
FIG. 1 illustrates various electronic devices with integrated receiver modules constructed in accordance with the principles of the present invention.

Referring now to the drawings, where like or similar elements are designated with identical reference numerals throughout the several views, and referring in particular to FIG. 1, it illustrates examples of electronic devices with integrated receiver modules 105 constructed in accordance with the principles of the present invention. Although only a computer 110, a PDA (personal digital assistant) 115, cell phone 120 and peripheral device 125 are illustrated, the present invention can include any type of wireless-enabled device and should not be limited to those devices shown. The receiver modules 105 in these various devices can include, for example, ASICs (application specific integrated circuits), software instructions, general purpose processors, or any combination thereof.

Figure 2:
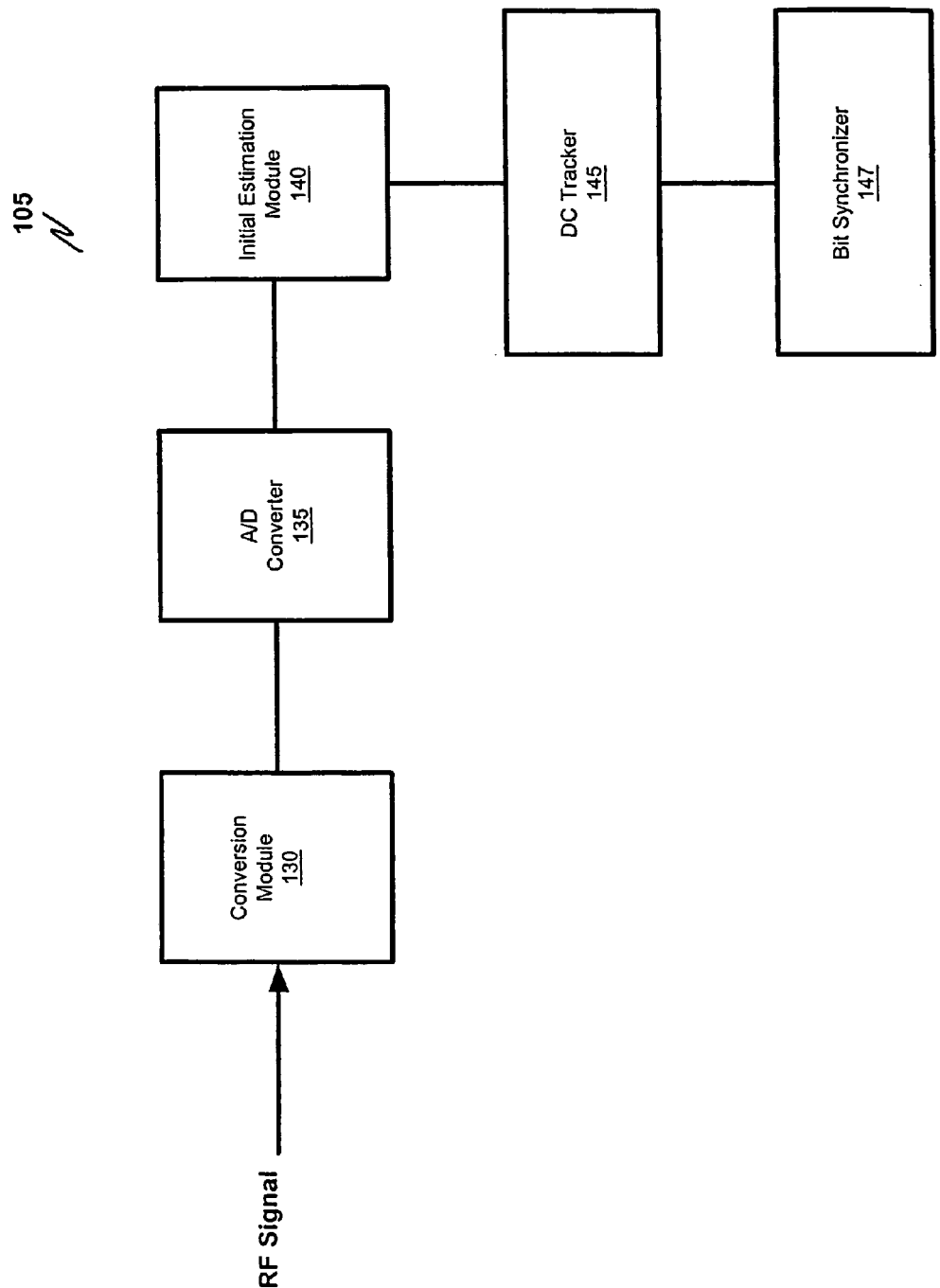
FIG. 2 illustrates an implementation of the receiver module of the present invention in greater detail.

FIG. 2 illustrates an implementation of the receiver module of the present invention in greater detail. In this implementation, a RF signal (or any other type of signal) is received at the radio module 130, which demodulates and downconverts the RF signal to a baseband signal. The radio module 130 then passes the baseband signal to the A/D converter 135, where the analog signal is converted to a digital signal. The A/D converter 135 then passes the digital signal to the initial DC estimation module 140, which determines the DC offset within the chosen portion of the received sync pattern. This DC offset can be passed as an initial DC estimate to a DC tracker 145 that monitors long term DC drift and generates a corresponding DC offset values continuously. Data from the DC tracker 145 can be provided to the bit synchronizer 147.

Figure 3:
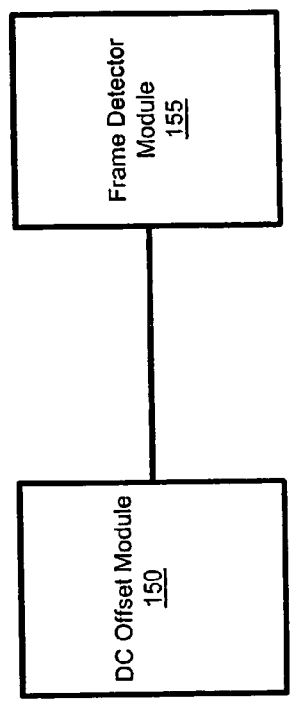
FIG. 3 illustrates an alternative implementation of the receiver module shown in FIG. 2.

Referring now to FIG. 3, it illustrates a more detailed implementation of the initial DC estimation module 140 shown in FIG. 2. In this embodiment, the initial DC estimation module 140 includes two components: a DC offset module 150 and a frame detector module 155. The DC offset module 150 is configured to determine a DC offset based upon at least a portion of a known sync pattern. In one embodiment, the DC estimation module 150 is configured to determine the DC offset using the first 34 bits of the 64 bit Bluetooth synchronization word and to detect a potential frame. The reason for using the first 34 bits of the synchronization word is that the bit pattern in the first 34 bits is more evenly distributed between "1"s and "0"s than in the latter 30 bits.

The frame detector module 155 is configured to confirm a potential frame detection by the DC offset module 150. In the preferred embodiment, the frame detector module 155 confirms the frame detection based upon the last 30 bits of the Bluetooth synchronization word.

Figure 4:
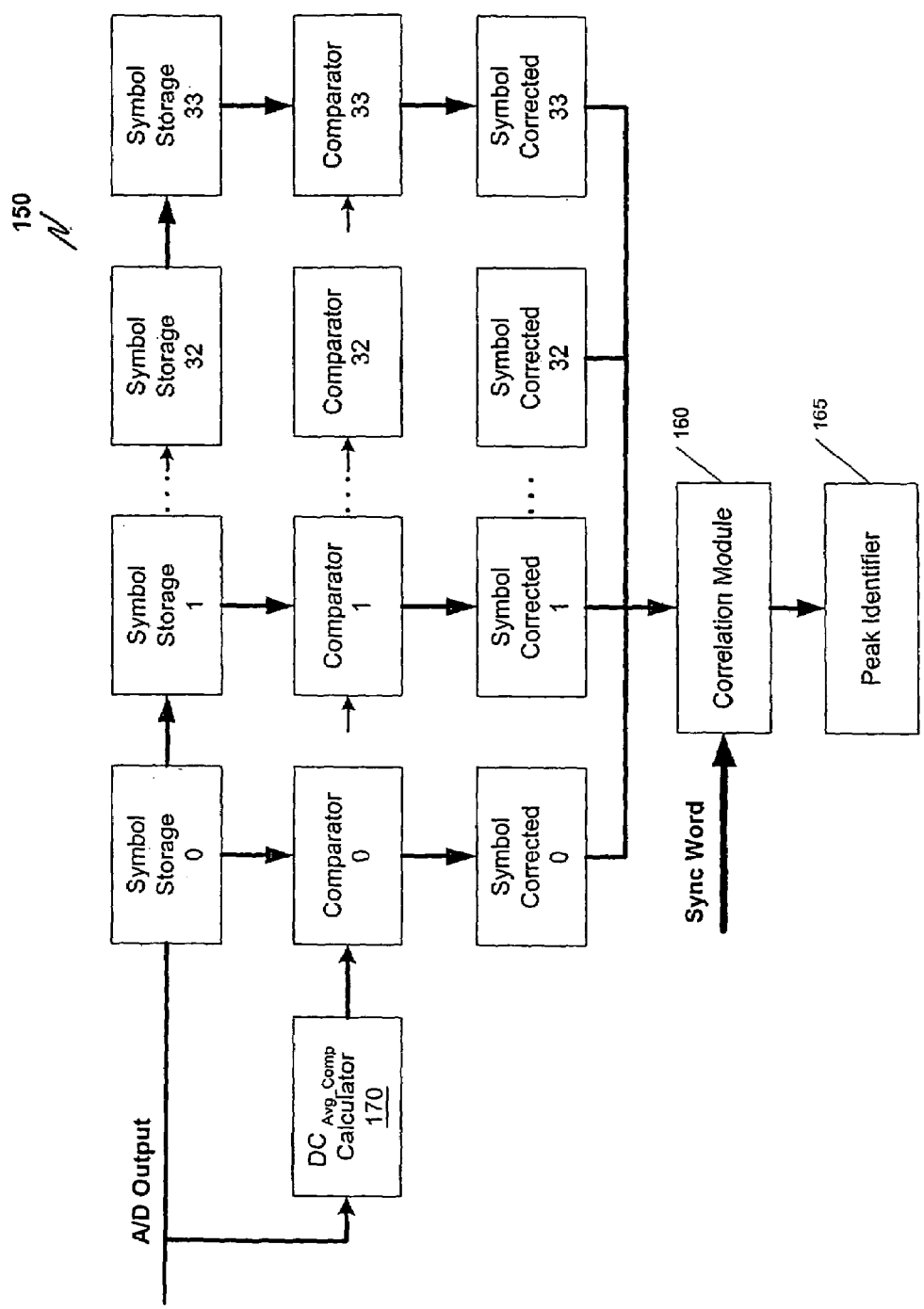
FIG. 4 illustrates a more detailed exemplary implementation (based on Bluetooth's sync pattern) of the initial DC offset estimation module shown in FIG. 3.

FIG. 4 illustrates a more detailed implementation of the DC offset module 150 shown in FIG. 3. This embodiment of the DC offset module 150 includes 34 storage locations (labeled as symbol storage 0 through symbol storage 33) for storing sample values related to bits 0 through 33 of the received synchronization word. For example, symbol storage 0 could include N individual storage locations to store the DC value of the received signal sampled at N times the symbol rate. Each of the symbol storage locations is associated with a comparator (labeled as comparator 0 through comparator 33.) Each of the sample values for a particular symbol are passed from a symbol storage to the appropriate comparator. The output of each individual comparator is determined by $$z_{34}(k, j) = \begin{cases} 1, & y(k + (j-34) \cdot 5) < DC_{avg\_comp}(k), \quad j = 1, 2, \ldots, 34 \\ 0, & y(k + (j-34) \cdot 5) > DC_{avg\_comp}(k) \end{cases}$$

where k is the current sample time index, y(i) is the output of the A/D converter 135, and $DC_{avg\_comp}(k)$ is the compensated DC average, which is described in detail below.

The $DC_{avg\_comp}$ calculator 170 calculates the $DC_{avg\_comp}$ value used by the comparators. If the sampling rate results in N samples per symbol, the $DC_{avg\_comp}$ calculator 170 would use 34×N running samples from the A/D converter 135. However, to reduce hardware complexity—by allowing bit shifting to replace complex multiplication—32×N samples from the A/D converter 135 can be used to calculate the DC average ($DC_{avg}$) which can be approximated by $$DC_{sum}(k) = \sum_{i=k-32 \times n+1}^{k} y(i)$$

$$DC_{avg}(k) = DC_{sum}(k)/(N \times 32)$$

$$= (DC_{sum}(k)/N) \gg 5$$

where k is the current sample time index and y(i) is the output from the A/D converter 135. If N=4, then $$DC_{sum}(k) = \sum_{i=k-32 \times 4+1}^{k} y(i)$$

$$DC_{avg}(k) = DC_{sum}(k)/(4 \times 32)$$

$$= (DC_{sum}(k)/4) \gg 5$$

$$= DC_{sum}(k) \gg 7.$$

Because the bits of the received synchronization word may have a non-ideal bit pattern that introduces DC bias, the $DC_{avg}$ should be corrected by a compensation factor (comp_fac.) This compensation factor can be calculated using the corresponding 32 bits of the synchronization word as comp_fac=$A_{peak}$(number of 1's−number of 0's) /32.

where $A_{peak}$ is the sample peak amplitude of the output from the A/D converter 135. Assuming bit inversion, the compensated DC average becomes $$DC_{avg\_comp}(k) \approx DC_{avg}(k) + \text{comp\_fac}.$$

Still referring to FIG. 4, the output from the individual comparators can be latched in storage devices, DC corrected symbol 0 through DC corrected symbol 33 (but do not necessarily need to be) and passed to a correlation module 160, which compares the output of the individual comparators with the known synchronization word to identify a potential frame detection. A potential frame detection can be declared at any sample time assuming a threshold number of bits of the DC corrected samples—as stored in DC corrected symbol 0 through DC corrected symbol 33—match the corresponding bits in the known synchronization word.

After a potential frame has been detected, the value for the $DC_{avg\_comp}(k)$ is frozen and the next symbol peak is identified by the peak identifier 165. For example, the correlation process could be continued for the next (N−1) samples to identify matching of the first 34 bits of the synchronization word. Assuming that the first 34 bit correlation match occurred at sample time n and N=4, the following rules can be used to determine the symbol peak location based on the correlation pattern over the four sample period (n to n+3):

1. If correlation matches occurred at both time n and n+3, regardless of what happened in between, the symbol peak is at n+2;
2. If the only matches occur at time n, the symbol peak is at n;
3. If a correlation match occurred at time n+3, and either time n+1 or n+2 or both also had correlation matches, the symbol peak is at n+2; and
4. For all other cases, the symbol peak is at n+1.

Figure 5:
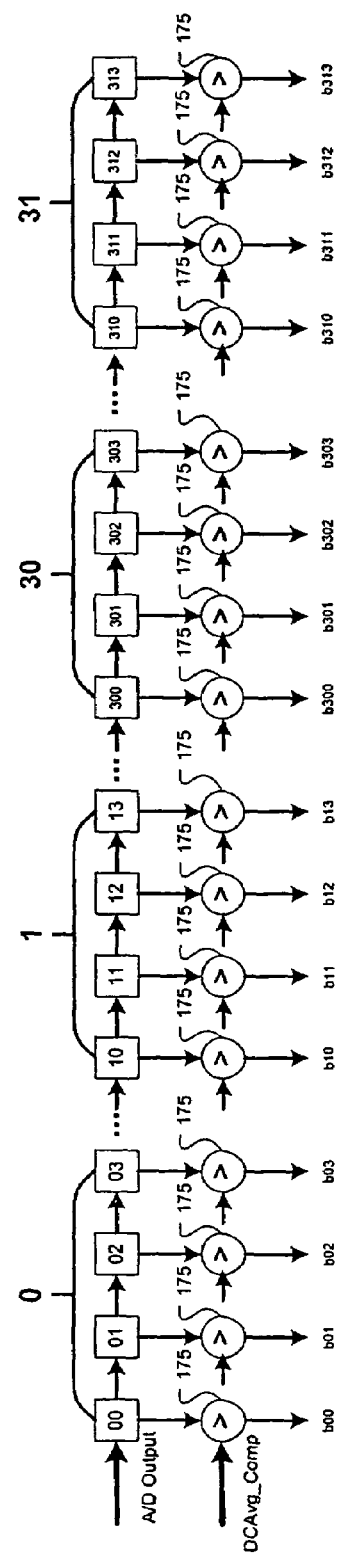
FIGS. 5 and 6 are exemplary circuit diagrams of an implementation of the initial DC estimation module shown in FIGS. 2 and 4.
Figure 6:
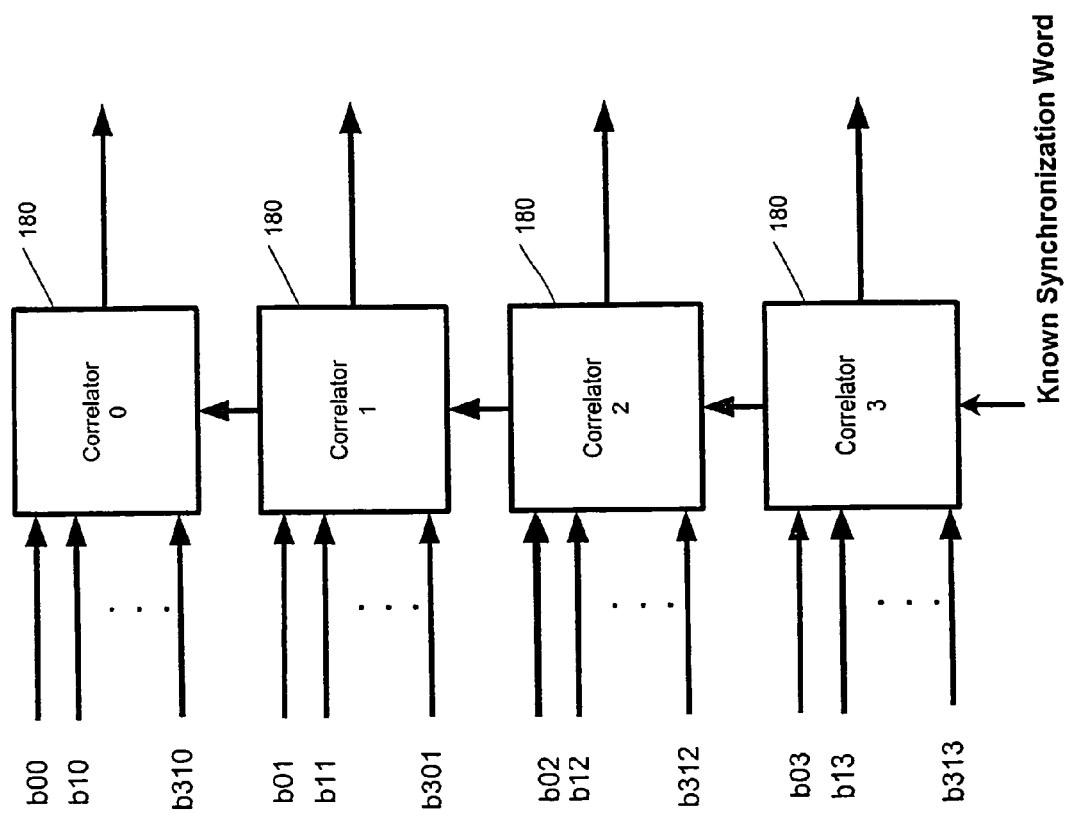

FIGS. 5 and 6 illustrate an implementation of the DC offset module shown in FIGS. 2 and 4. In this implementation, symbol storage 0 is represented by latches 00 through 03; symbol storage 1 is represented by latches 10 through 13; . . . symbol storage 32 is represented by latches 320 through 323; and symbol storage 33 is represented by latches 330 through 333. Similarly, comparator 0, comparator 1, . . . comparator 32, and comparator 33 are represented by the corresponding groupings of four comparators 175. Although only four latches and only four comparators are shown per symbol storage, the number of latches and comparators can be easily varied according to the sample rate.

The output from each latch is passed to the corresponding comparator 175 and compared against $DC_{avg\_comp}$, which is an input to each comparator 175. The output from each comparator 175 is then passed to one of the correlation modules shown in FIG. 6. For example, the outputs b00, b10, . . . , b330 are passed to correlator 0; the outputs b01, b11, . . . , b331 are passed to correlator 1; and so on. In other words, the first sample from each symbol storage is passed to a first correlation module, the second sample to a second correlation module, the third sample to a third correlation module, and the fourth sample to a fourth correlation module.

At each of the four correlation modules, the DC corrected samples are compared against the known synchronization word. When a threshold number of bits are matched, the appropriate line is signaled, the $DC_{avg\_comp}(k)$ value is frozen, and a potential frame detection is declared.

Figure 7:
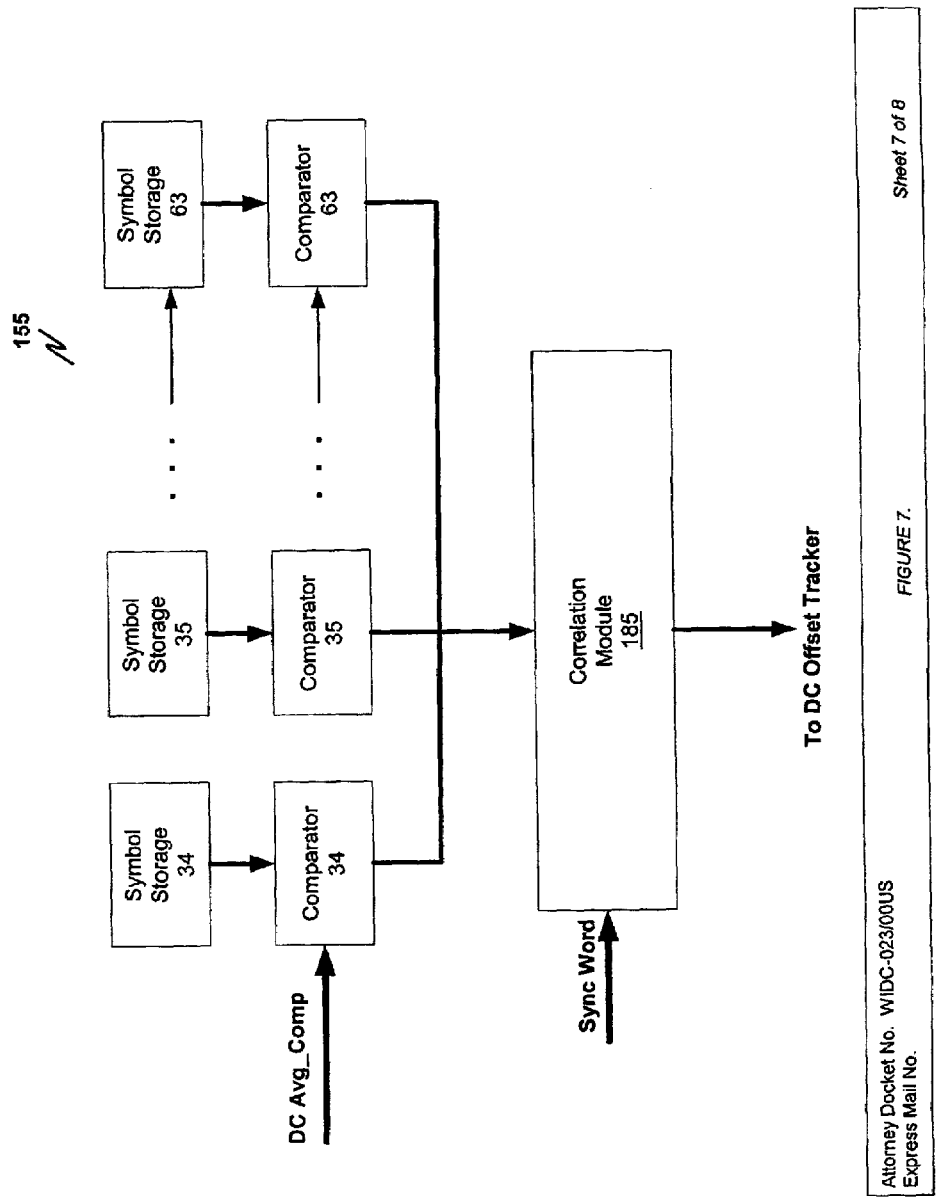
FIG. 7 illustrates an exemplary implementation of the frame detector module shown in FIG. 4.

Referring now to FIG. 7, it illustrates a block diagram of the frame detection module 155 of FIG. 4. Once the DC offset module 150 declares a potential frame detection, the frame detector module 155 uses the frozen $DC_{avg\_comp}(n)$ (n being the time at which a potential frame detection is declared) and identified symbol peak to verify the frame detection. In this embodiment, for example, samples corresponding to bits 34-63 of the received synchronization word are stored in corresponding symbol storage locations, symbol storage 34 through symbol storage 63. These samples are passed to the appropriate comparators, comparator 34 through comparator 63, where the output can be expressed as $$z_{30}(k, j) = \begin{cases} 1, & y(n' + j \cdot N) < DC_{avg\_comp}(n), \quad j = 1, 2, \ldots, 30 \\ 0, & y(n' + j \cdot N) > DC_{avg\_comp}(n) \end{cases}$$

where n' is the current symbol peak location and n is the sample time at which the DC offset module 150 declared the first 34 bit correlation match.

The output from the individual comparators is then passed to the correlation module 185 where each comparator's output can be compared against the corresponding bit of the last 30 bits of the known synchronization word. If the number of matched bits between the output from the comparators and the last 30 bits of the known synchronization word are greater than or equal to a threshold value, a frame detection is declared and $DC_{avg\_comp}(n)$ can be passed to a long-term DC tracker 145 as an initial DC offset estimate. Alternatively, if the threshold value is not crossed, the $DC_{avg\_comp}(k)$ value is unfrozen and the calculation of the DC offset estimation based on the first 34 bits of the synchronization word is restarted.

Figure 8:
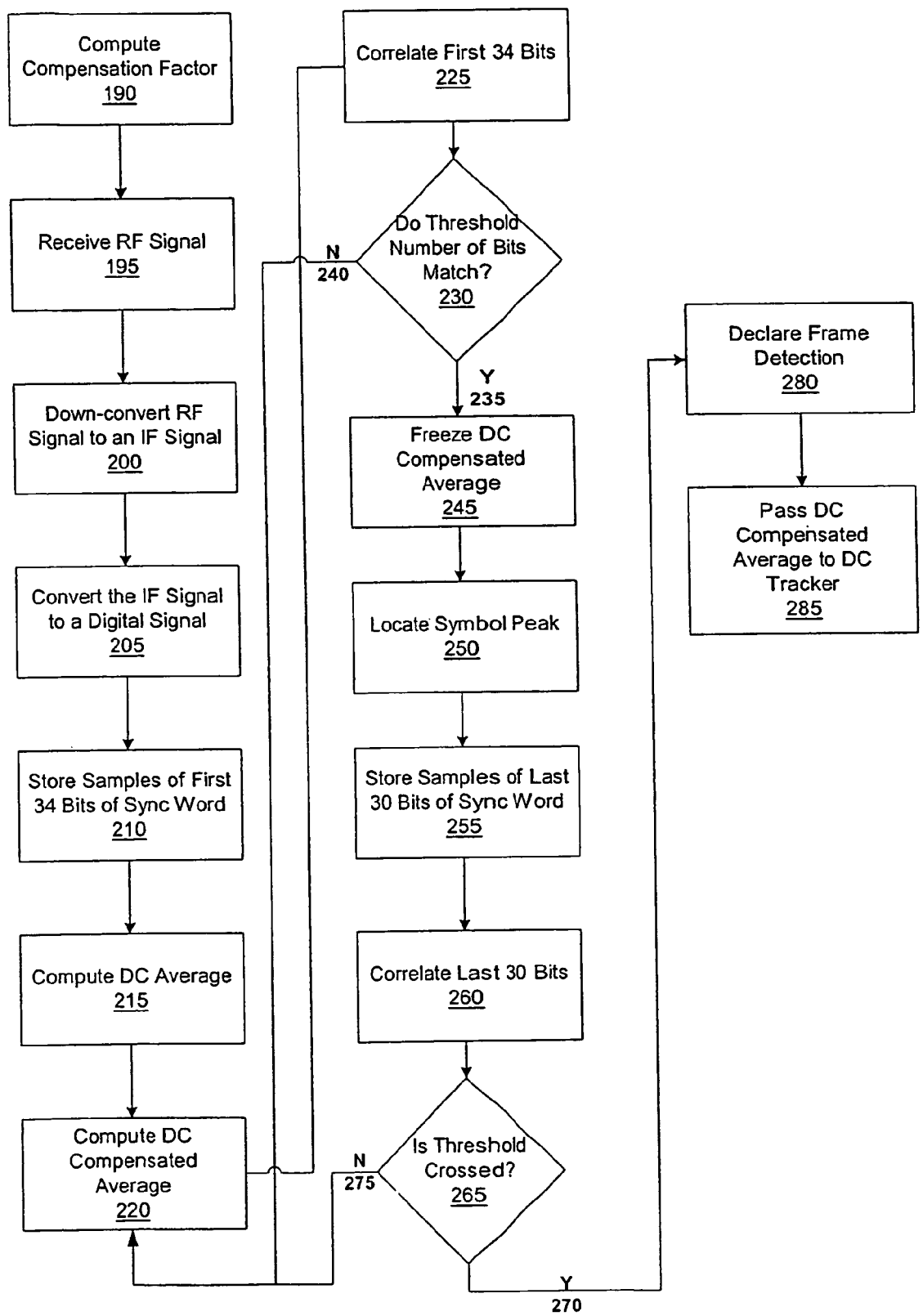
FIG. 8 is a flow chart of one method of operating an embodiment of the present invention based on Bluetooth sync pattern.

FIG. 8 is a flowchart of one method of operating the present invention. This method is described in terms of the Bluetooth protocol. However, one skilled in the art can easily recognize that this method could be adapted to operate for virtually any wireless protocol—especially those using a pilot signal or a synchronization word.

Initially, an electronic device computes a compensation factor using the first 32 bits of known synchronization word (step 190). This compensation factor can be expressed as comp_fac=$A_{peak}$(number of 1's–number of 0's)/32.

At some point, that electronic device receives an RF signal including the synchronization word (step 195). This RF signal is then demodulated and downconverted to a baseband signal which is in turn converted from analog to digital form (steps 200 and 205). Samples of the first 34 bits of the synchronization word are then taken and stored (step 190).

Next, the $DC_{sum}$ is calculated using 32×N samples. Although the first 34×N (N being the number of oversampling as compared to the nominal symbol rate) running samples from the A/D converter can be stored, hardware complexity can be reduced by using only 32×N samples in the calculations. The $DC_{sum}$ can be estimated by $$DC_{sum}(k) = \sum_{i=k-32 \times N+1}^{k} y(i)$$

where k is the sample time index and y(i) is the output from the A/D converter 135. Using this $DC_{sum}$, a $DC_{avg}$ can be estimated (step 215). $DC_{avg}$ can be represented as $DC_{avg}(k)=DC_{sum}(k)/(N \times 32)$.

Finally, the compensated DC average can be calculated (step 220) by $DC_{avg\_comp}(k)=DC_{avg}(k)+$comp_fac Next, the received data, as DC adjusted and bit sliced, can be compared against the known synchronization word to determine if there is a correlation (step 225). When the number of matched bits between the bit sliced data and the known synchronization word is greater than or equal to a threshold (step 230), a potential frame detection can be declared and branch 235 is followed. Otherwise, branch 240 is followed and the $DC_{sum}(k)$ is recomputed for the next sample time.

Assuming that the threshold value has been crossed and branch 235 followed, the $DC_{avg\_comp}(k)$ for the current sample time is frozen (step 245) and a symbol peak is located (step 250). Assuming that the potential frame detection was declared at sample time n and N=4, the following rules determine the symbol peak location based on a continued correlation over the next five sample period (n to n+4):

1) If correlation matches occurred at both time n and n+4, regardless of what happened in between, the symbol peak is at n+2;
2) If the only matches occur at time n, the symbol peak is at n;
3) For all other cases, if the symbol peak is at n+1 or n+2 or both also had correlation matches, the symbol peak is at n+2; and
4) For all other cases, the symbol peak is at n+1.

Next, the potential frame detection is verified by storing samples of the last 30 bits of the 64 bit synchronization word (step 255). These 30 bits are then correlated with the remaining 30 bits of the known synchronization word (step 260 and 265). If the number of matched bits is greater than or equal to a threshold value, a frame detection is declared (step 280) and a $DC_{avg\_comp}(n)$ is passed to a long-term DC tracker (step 285). Otherwise, branch 275 is followed and the $DC_{avg\_comp}(k)$ is unfrozen and the process repeated.

In conclusion, the present invention provides, among other things, a system and method for optimizing wireless communication systems and devices. Although the present system is described primarily with relation to Bluetooth, the present invention can be adapted to work with virtually any type of wireless protocol. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for operating a wireless Bluetooth-enabled communication device, comprising:
    computing a compensated DC average for a first plurality of bits of an incoming pilot signal using a DC compensation factor and a DC average;
    adjusting an indication of a received first plurality of bits according to the computed compensated DC average;
    comparing the adjusted indication of the received first plurality of bits with corresponding bits of a known pilot signal; and
    responsive to a threshold number of bits of the adjusted indication of the received first plurality of bits matching the corresponding bits of the known pilot signal, outputting the compensated DC average for the first plurality of bits.

2. The method according to claim 1, comprising:
    locating a symbol peak in a received second plurality of bits of the incoming pilot signal; and
    using the symbol peak to determine a symbol timing of the incoming pilot signal.

3. The method according to claim 2, comprising:
adjusting an indication of a received third plurality of bits according to the computed compensated DC average;
comparing the adjusted indication of the received third plurality of bits with corresponding bits of the known pilot signal; and
responsive to the threshold number of bits of the adjusted indication of the received first plurality of bits matching the corresponding bits of the known pilot signal and responsive to a threshold number of bits of the adjusted indication of the received third plurality of bits matching the corresponding bits of the known pilot signal, providing the compensated DC average for the first plurality of bits to a DC tracker.

4. The method according to claim 1, comprising:
outputting the compensated DC average for the first plurality of bits to a DC tracker.

5. The method according to claim 1, wherein the known pilot signal comprises a frame sync pattern.

6. A wireless communication device, comprising:
a receiver that is configured to compute a compensated DC average for a first plurality of bits of an incoming pilot signal using a DC compensation factor and a DC average, configured to adjust an indication of a received first plurality of bits according to the computed compensated DC average, configured to compare the adjusted indication of the received first plurality of bits with corresponding bits of a known pilot signal, and configured to provide the compensated DC average for the first plurality of bits in response to a threshold number of bits of the adjusted indication of the received first plurality of bits matching the corresponding bits of the known pilot signal.

7. The wireless communication device according to claim 6,
wherein the receiver is configured to locate a symbol peak in a received second plurality of bits of the incoming pilot signal; and
wherein the receiver is configured to use the symbol peak to determine a symbol timing of the incoming pilot signal.

8. The wireless communication device according to claim 6, wherein the receiver comprises a Bluetooth-enabled receiver.

9. A method for operating a wireless Bluetooth-enabled communication device, comprising:
computing a compensated DC average using a DC average and a DC compensation factor;
determining whether a threshold number of bits of a first portion of a received synchronization word as adjusted by the DC compensation factor match corresponding bits in a known synchronization word; and
responsive to a threshold number of bits of the first portion of the received synchronization word as adjusted by the DC compensation factor matching the corresponding bits in the known synchronization word, providing the compensated DC average to an offset tracking device.

10. The method according to claim 9, comprising:
determining whether a threshold number of bits of a second portion of the received synchronization word as adjusted by the DC compensation factor match corresponding bits in the known synchronization word; and responsive to a threshold number of bits of the second portion of the received synchronization word as adjusted by the DC compensation factor matching the corresponding bits in the known synchronization word, providing a second compensated DC average to the offset tracking device.

11. A wireless communication device, comprising:
a receiver configured to compute a compensated DC average using a DC average and a DC compensation factor, configured to determine whether a threshold number of bits of a first portion of a received synchronization word as adjusted by the DC compensation factor match corresponding bits in a known synchronization word, and configured to provide the compensated DC average to an offset tracker of the receiver in response to a threshold number of bits of the first portion of the received synchronization word as adjusted by the DC compensation factor matching the corresponding bits in the known synchronization word.

12. The wireless communication device according to claim 11,
wherein the receiver is configured to determine whether a threshold number of bits of a second portion of the received synchronization word as adjusted by the DC compensation factor match corresponding bits in the known synchronization word, and
wherein the receiver is configured to provide a second compensated DC average to the offset tracker in response to a threshold number of bits of the second portion of the received synchronization word as adjusted by the DC compensation factor matching the corresponding bits in the known synchronization word.

13. The wireless communication device according to claim 11, wherein the receiver comprises a Bluetooth-enabled receiver.

14. A method for operating a wireless communication device, comprising:
computing a compensated DC average using a DC average and a DC compensation factor;
determining whether a threshold number of bits of a first portion of a received synchronization word as adjusted by the DC compensation factor match corresponding bits in a known synchronization word;
responsive to a threshold number of bits of the first portion of the received synchronization word as adjusted by the DC compensation factor matching the corresponding bits in the known synchronization word, providing the compensated DC average to an offset tracking device; and
determining whether a threshold number of bits of a second portion of the received synchronization word as adjusted by the DC compensation factor match corresponding bits in the known synchronization word; and
responsive to a threshold number of bits of the second portion of the received synchronization word as adjusted by the DC compensation factor matching the corresponding bits in the known synchronization word, providing a second compensated DC average to the offset tracking device.

* * * * *